United States Patent
Chou et al.

(10) Patent No.: US 6,335,515 B1
(45) Date of Patent: Jan. 1, 2002

(54) ELECTRIC HEAT SEALER WITH OFFSET SEALER PORTION

(75) Inventors: Shu Hui Chou; Richard Chang, both of Taipei Hsien (TW)

(73) Assignee: Welcome Company, Ltd. (TW)

( * ) Notice: Subject to any disclaimer, the term of this patent is extended or adjusted under 35 U.S.C. 154(b) by 0 days.

(21) Appl. No.: 09/495,999

(22) Filed: Feb. 1, 2000

Related U.S. Application Data

(63) Continuation-in-part of application No. 09/189,359, filed on Nov. 8, 1998, which is a continuation-in-part of application No. 08/917,358, filed on Aug. 26, 1997, now Pat. No. 5,854,466.

(51) Int. Cl.[7] .................................................. H05B 1/00
(52) U.S. Cl. ........................ 219/243; 219/227; 219/233
(58) Field of Search .................... 219/243, 233, 219/227, 229, 201, 221, 240, 241, 524, 535, 544; 156/579, 515, 583.1, 583.2, 583.4, 583.8, 583.9, 379.6, 499

(56) References Cited

U.S. PATENT DOCUMENTS

| | | |
|---|---|---|
| RE8,282 E | 6/1878 | Eaton |
| 1,083,386 A | 1/1914 | Chapman |
| 1,656,690 A | 1/1928 | Blackburn |
| 1,850,280 A | 3/1932 | Haynes |
| 2,371,438 A | 3/1945 | Gilliver ............................. 219/4 |
| 2,465,722 A | 3/1949 | Hamilton ...................... 173/273 |
| 2,669,642 A | 2/1954 | Menges ........................... 219/21 |
| 2,974,717 A | 3/1961 | Lindsay ........................... 154/42 |
| 3,319,047 A | 5/1967 | Jones, Jr. et al. ............. 219/388 |
| 3,381,450 A | 5/1968 | Monks ............................. 53/390 |
| 3,408,478 A | 10/1968 | Penn ............................... 219/229 |
| 3,624,349 A | 11/1971 | Mayer ............................ 219/243 |
| 3,660,959 A | 5/1972 | La Fleur ........................... 53/14 |
| 3,752,017 A | 8/1973 | Lloyd et al. ................. 81/9.5 B |
| 3,847,712 A | * 11/1974 | Hubbard ....................... 156/515 |
| 4,212,311 A | 7/1980 | Del Valle .................... 132/31 A |
| 4,213,460 A | 7/1980 | Weiner .......................... 219/201 |
| 4,247,753 A | 1/1981 | Jaronen ......................... 219/201 |
| 4,412,125 A | * 10/1983 | Nagasawa et al. ........... 219/549 |
| 4,438,323 A | 3/1984 | Millnes .......................... 219/243 |
| 4,561,925 A | 12/1985 | Skerjance et al. ......... 156/379.6 |
| 5,142,123 A | 8/1992 | Chou ............................. 219/243 |
| 5,149,943 A | * 9/1992 | Kupcikevicius et al. .... 219/243 |
| 5,374,806 A | 12/1994 | Chou ............................. 219/229 |
| 5,641,418 A | 6/1997 | Chou ............................. 219/229 |
| 5,854,466 A | 12/1998 | Chou ............................. 219/227 |

FOREIGN PATENT DOCUMENTS

| | | |
|---|---|---|
| FR | 969.962 | 12/1950 |
| NL | 542359 | 8/1959 |
| TW | 101608 | 4/1988 |
| TW | 97926 | 7/1988 |

* cited by examiner

Primary Examiner—Teresa Walberg
Assistant Examiner—Quang Van
(74) Attorney, Agent, or Firm—Jeffer, Mangels, Butler & Marmaro LLP

(57) ABSTRACT

An electric heat sealer that has a main body having a longitudinal axis, and a sealing mechanism having a center point. The center point of the sealing mechanism is offset from the longitudinal axis. The electric heat sealer is used for sealing workpieces such as plastic bags or the like and also includes a casing defining a battery chamber and a press bar pivotally connected to the casing. The sealing mechanism is supported on a compression spring in a spring holder inside the casing, and a safety device. The sealing mechanism is electrically connected to produce heat for sealing the workpiece being put thereon when the press bar pressed against the sealing mechanism. The safety device breaks the electrical circuit when the apparatus is not in use.

31 Claims, 13 Drawing Sheets

ELECTRIC HEAT SEALER WITH OFFSET SEALER PORTION

This is a continuation-in-part of U.S. patent application Ser. No. 09/189,359, filed Nov. 8, 1998, which in turn is a continuation-in-part of U.S. patent application Ser. No. 08/917,358, filed Aug. 26, 1997, now U.S. Pat. No. 5,854,466, the disclosures of each of which are incorporated in their entireties herein by reference.

FIELD OF THE INVENTION

The present invention relates to an electric heat sealer, and more particularly to an electric heat sealer which can be controlled to break the electric circuit when the apparatus is not in use, so as to prevent an electric connection by a false action.

BACKGROUND OF THE INVENTION

A variety of electric heat sealers have been developed for home use, and have appeared on the market. An example of such a device is disclosed in U.S. Pat. No. 5,142,123.

Conventional electric heat sealers are functional for sealing plastic bags and the like. However, these electric heat sealers have no safety control means. When an electric heat sealer is touched by an external force, the sealing mechanism may be electrically connected to produce heat, potentially causing an accident to occur.

Another problem with conventional electric heat sealers is that it is often necessary to take two "swipes" at a plastic bag to seal the bag with the sealer. For example, when sealing a bag by swiping from the left to the right, because of the configuration of the sealer, the left most portion of the bag is often left unsealed. It is then necessary to seal the unsealed area by swiping that portion from the right to the left.

A need exists for an electric heat sealer which eliminates the aforesaid problems, and which is handy and safe in use.

BACKGROUND OF THE INVENTION

In accordance with one preferred aspect of the present invention, there is provided an electric heat sealer comprising a casing, a battery chamber, a spring holder, a sealing mechanism, a press bar, and a safety device. The casing holds the battery chamber, the spring holder, the sealing mechanism and the safety device on the inside. The battery chamber comprises a front upright support; a rear upright support; a first front terminal plate and a second front terminal plate respectively mounted on the front upright support; a pair of rear terminal plates respectively mounted on the rear upright support; a first metal contact plate mounted on the front upright support and connected the first front terminal plate; and a second metal contact plate mounted on the front upright support and spaced from the second terminal plate by a gap. The second terminal plate is forced into contact with the second metal contact plate when a battery set is installed in the battery chamber. The spring holder is mounted in the casing and spaced between the first metal contact plate and the second metal contact plate. The sealing mechanism is mounted in the casing and moved up and down relative to the first and second metal contact plates.

The sealing mechanism comprises a heat insulative base; an electric wire; two metal locating plates; and a compression spring. The heat insulative base comprises a protrusive middle portion. The electric heating wire is mounted on the protrusive middle portion of the heat insulative base. The metal locating plates are fixedly fastened to the heat insulative base at two opposite sides and respectively connected to two opposite ends of the electric heating wire. The compression spring is connected between the spring holder and the protrusive middle position of the heat insulative base.

The press bar has a fixed end pivotally connected to one end of the casing and a free and fixedly mounted with a heat insulative press block. The heat insulative press block is forced against the protrusive middle portion of the heat insulative base of the sealing mechanism when the press bar is depressed.

The safety device comprises a safety switch with two opposite terminals. The safety switch has two lead wires respectively extended from the two opposite terminals thereof and respectively connected to the second terminal plate and the second metal contact plate.

In a preferred embodiment, the inventive electric heat sealer further includes a protective frame pivotally connected to the casing and pivotable between a first position and a second position. In the first position, the protective frame is spaced between the heat insulative base of the sealing mechanism and the heat insulative press block of the press bar. In the second position, the protective frame is pivoted out of the space between the base and the press block.

Preferably, the electric heat sealing wire and the press block are covered by heat insulative sheets, which preferably are comprised of a heat-resistant material such as a Teflon mesh.

In another preferred embodiment, the inventive heat sealer further includes a cover device for the casing. The cover device has defined therein an opening through which the protrusive middle portion of the heat insulative base of the sealing mechanism extends out of the casing. More specifically, the cover device includes a front cover plate disposed on a front portion of the casing, a rear cover plate disposed on a rear portion of the casing, and an intermediate cover plate disposed on a middle portion of the casing over the battery chamber.

In accordance with another aspect of the present invention, there is provided an electric heat sealer which includes a casing; a cover device; first and second metal contact plates; a sealing mechanism; resilient means, such as a spring, piston or the like, biasing the sealing mechanism in an upward direction; operating means pivotally connected to the casing; and a safety device.

The cover device covers the casing and has an opening formed therethrough. The first and second metal contact plates are mounted within the casing below the opening in the cover device. The sealing mechanism is mounted in the casing and moves up and down relative to the first and second metal contact plates. The sealing mechanism includes: a heat insulative base having a protrusive middle portion; an electric heating wire mounted on the protrusive middle portion of the heat insulative base, the electric heating wire having two opposite ends; and two metal locating plates mounted on the heat insulative base and respectively connected to the opposite ends of the electric heating wire.

The resilient means biases the sealing mechanism in an upward direction so that the protrusive middle portion of the heat insulative base extends through the opening in the cover device. The operating means is pivotally connected to the casing and extends above the opening in the cover device. The operating means is movable downwardly to engage an object to be sealed which is supported on the protrusive middle portion of the heat insulative base extending through the opening and urge the heat insulative base downwardly and cause the metal locating plates to engage the metal contact plates. This causes electrical current to flow through and heat the electric heating wire when the metal contact plates are connected to a source of electrical current.

The safety device selectively prevents electrical current from flowing through the electric heating wire.

In a preferred embodiment, the inventive heat sealer is adapted to be supplied with electrical current from at least one current source selected from the group consisting of a DC current source and an AC current source. Particularly, the inventive heat sealer is adapted to be supplied with electrical current from both a DC current source and an AC current source.

More particularly, the inventive heat sealer is adapted to be supplied with electrical current from a DC current source which is a battery set. In this embodiment, the casing defines a battery chamber adapted to receive a battery set, the battery chamber including a front upright support; a rear upright support; first and second front terminal plates respectively mounted on the front upright support; a pair of rear terminal plates respectively mounted on the rear upright support; a first metal contact plate mounted on the front upright support and connected to the first front terminal plate; and a second metal contact plate mounted on the front upright support and spaced from the second terminal plate by a gap. The second terminal plate is forced into contact with the second metal contact plate when a battery set is installed in the battery chamber.

Preferably, the safety device includes a safety switch having two opposite terminals and two lead wires respectively extending from the two opposite terminals thereof and respectively connected to the foregoing second terminal plate and the second metal contact plate.

In accordance with a further aspect of the present invention, there is provided an electric heat sealer comprising: a casing having an opening formed therethrough; first and second metal contact plates mounted within the casing below the opening; a sealing mechanism as described above, the sealing mechanism being mounted in the casing and moving up and down relative to the first and second metal contact plates; resilient means biasing the sealing mechanism in an upward direction so that the protrusive middle portion of the heat insulative base extends through the opening in the casing; operating means pivotally connected to the casing and extending above the opening in the casing as described above; and a safety device which selectively prevents electrical current from flowing through the electric heating wire.

In accordance with yet another aspect of the present invention there is provided an electric heat sealer that includes a main body having a longitudinal axis, and a sealing mechanism having a center point. The center point of the sealing mechanism is offset from said longitudinal axis. In a preferred embodiment, the sealer includes an offset sealer portion, in which the sealing mechanism is disposed, extending from the main body. In another preferred embodiment the sealer includes a press bar. In this embodiment, the offset sealer portion has an upper member that extends from the press bar and a lower member, wherein said main body includes a casing, wherein said upper member extends from said press bar and said lower member extends from said casing, and said sealing mechanism is disposed in said lower member.

In accordance with yet another aspect of the present invention there is provided an electric heat sealer that includes a casing that defines a longitudinal axis and has a first offset sealer portion extending therefrom, and a sealing mechanism mounted in the first offset sealer portion. The sealing mechanism has a center point that is spaced from the longitudinal axis. In a preferred embodiment, the electric heat sealer includes a second offset sealer portion that extends from the casing in a direction substantially opposite of the first offset sealer portion.

In accordance with yet another aspect of the present invention there is provided a method of sealing comprising the steps of providing an object to be sealed and sealing the object to be sealed using a sealer wherein an offset sealer portion follows a main body portion.

In accordance with yet another aspect of the present invention there is provided a method of sealing comprising the steps of providing an electric heat sealer having an offset sealer portion with a heating wire, providing an object to be sealed positioning the sealer such that the heating wire extends over an edge of the object to be sealed, and sealing the object to be sealed with a single swipe. In a preferred embodiment, the method also includes the step of causing the sealer to apply an offset force to the object to be sealed, before swiping the sealer across the object to be sealed.

In accordance with yet another embodiment of the present invention there is provided a sealing mechanism for use with an electric heat sealer that includes a heat insulative base. The heat insulative base has at least one extension member extending from a side thereof. A channel is defined between the side and the extension member.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
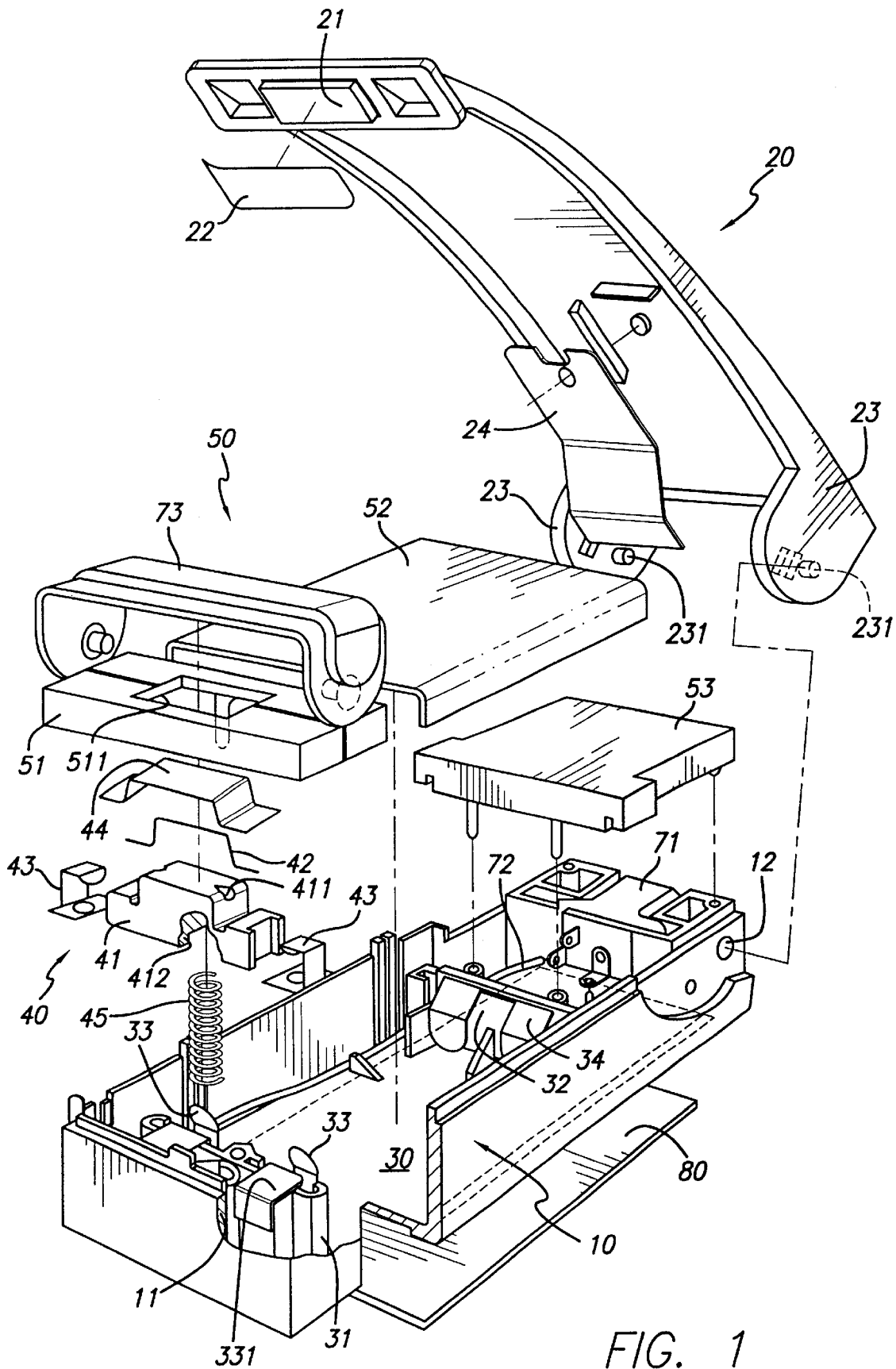
FIG. 1 is an exploded view of an electric heat sealer according to the present invention.
Figure 2:
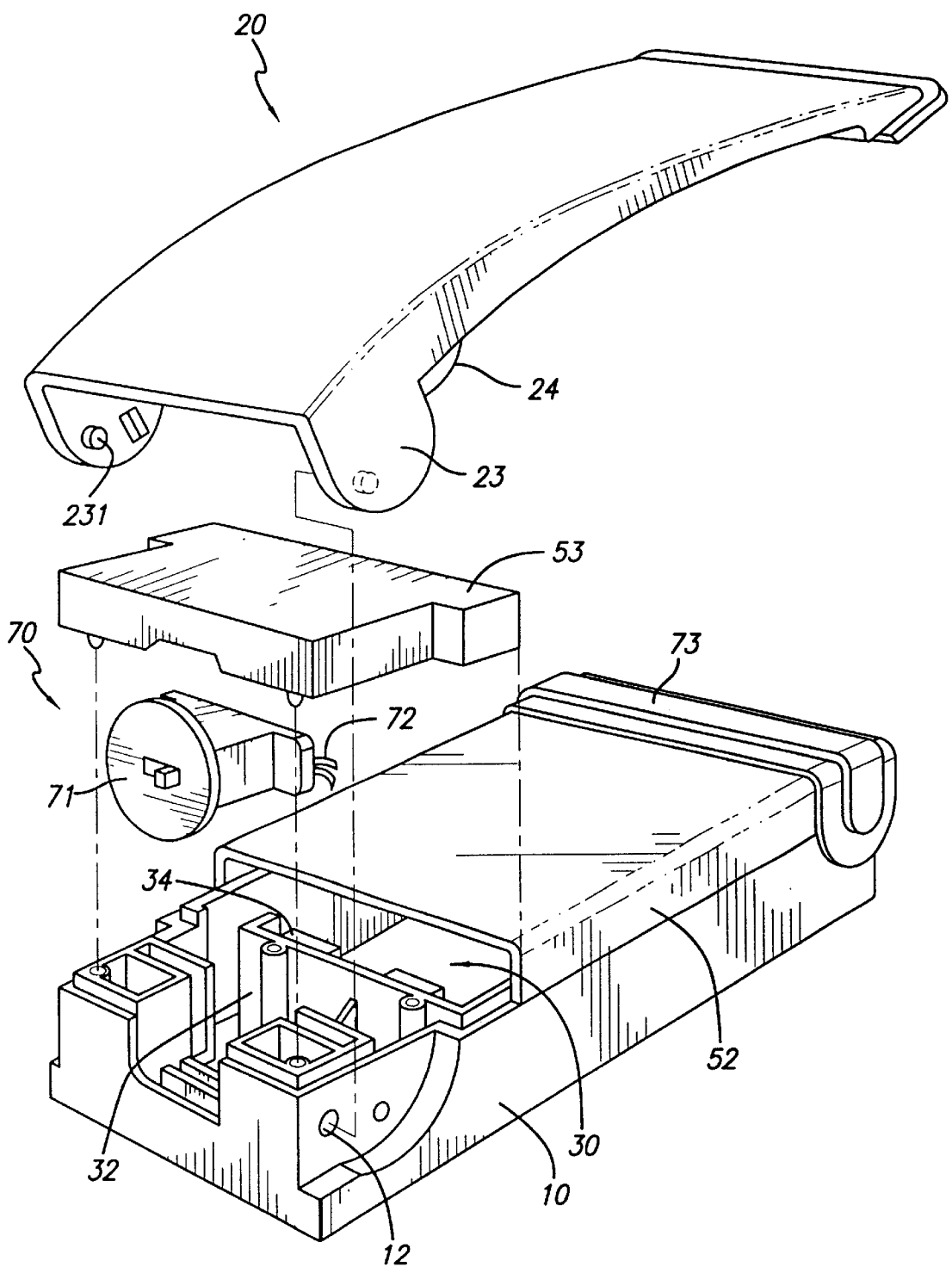
FIG. 2 is another exploded view of the present invention.
Figure 3:
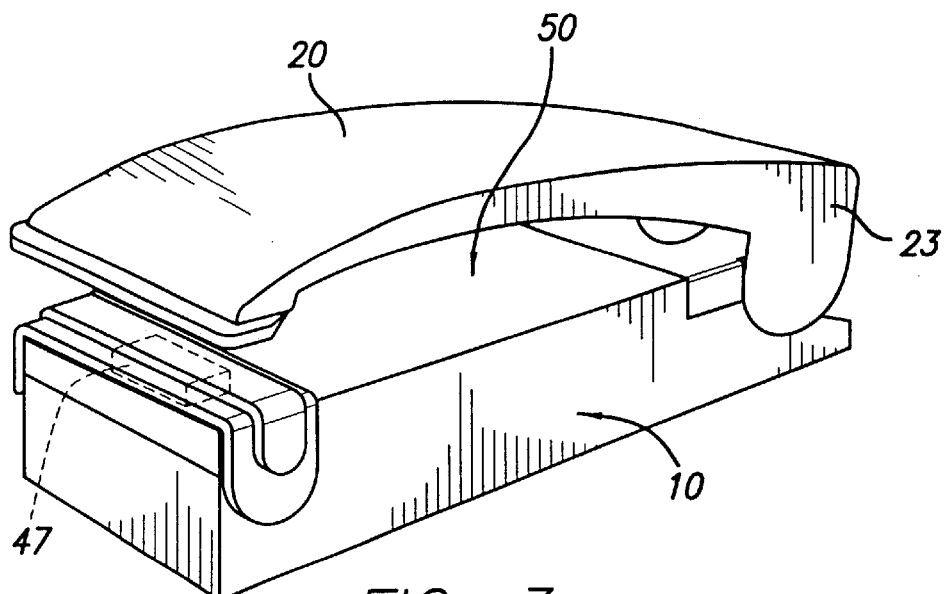
FIG. 3 is a perspective view of the present invention when viewed from the front side.
Figure 4:
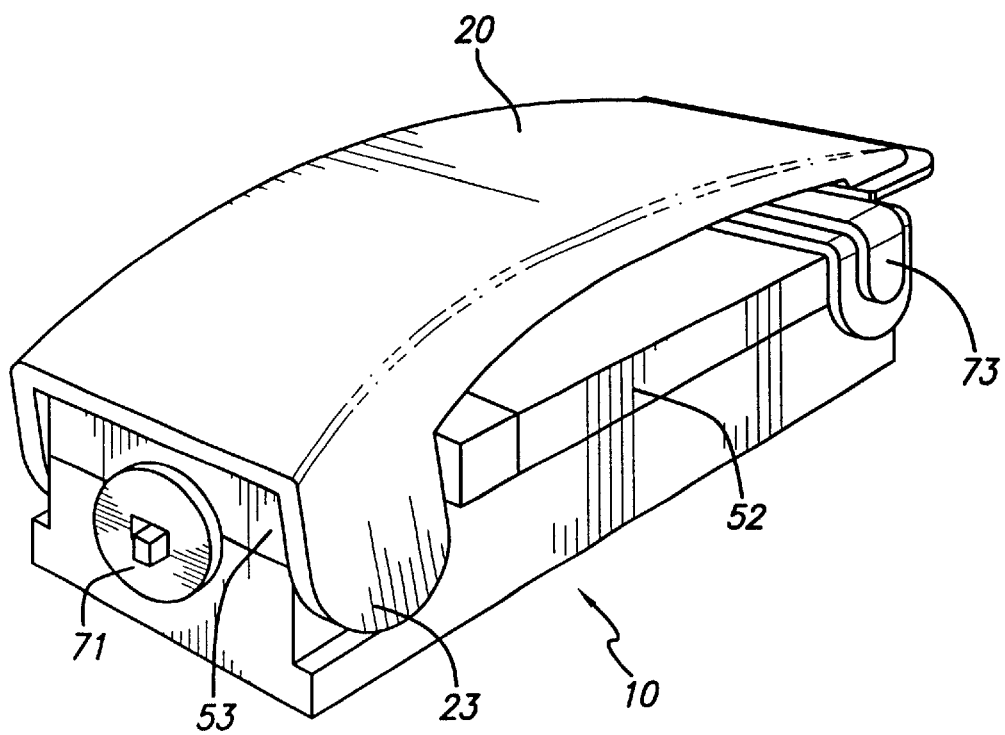
FIG. 4 is another perspective rear side view of the present invention when viewed from the rear side.

Referring to FIGS. 1–4 and 7, a first embodiment of an electric heat sealer in accordance with the present invention includes a casing 10, a spring holder 11, a press bar 20, a battery chamber 30, a sealing mechanism 40, and a safety device 70.

The battery chamber 30 is defined within the casing 10. The battery chamber 30 comprises a front upright support 31, a rear upright support 32, a pair of front terminal plates 33 and a rear terminal unit having a pair of rear terminal plates 34 respectively mounted on the front upright support 31 and the rear upright support 32. When battery cells (not shown) are installed in the battery chamber 30, the positive and negative terminals of the battery cells are respectively connected to the metal contact plates 33, 34.

A pair of flat metal contact plates 331 are mounted on the front upright support 31. One flat metal contact plate 331 is directly connected to one front terminal plate 33. Alternatively, the two plates 331 and 31 can form a single unit. The other flat metal contact plate 331 is spaced from the other front terminal plate 33 by a gap 332.

The spring holder 11 is mounted in the front upright support 31 between the flat metal contact plates 331.

The sealing mechanism 40 is mounted within the casing 10, comprising a heat insulative base 41, an electric heating wire 42, two metal locating plates 43, a heat resisting cover sheet 44, and a compression spring 45. The heat insulative base 41 comprises a protrusive middle portion 411. The locating plates 43 are fasted to two opposite sides of the heat insulative base 41 to hold the electric heating wire 42 on the protrusive middle portion 411. The heat resisting cover sheet 44 is covered on the heat insulative base 41 over the electric heating wire 42 to protect the electric heating wire 42. The heat insulative cover sheet 44 preferably is a meshed member, made from a heat-resistant material such as Teflon, providing a smooth surface. The heat insulative base 41 has a bottom mounting hole 412 at the bottom of the protrusive middle portion 411. The bottom mounting hole 412 is preferably a circular hole. The compression spring 45 has a bottom end received in the spring holder 11, and a top end inserted into the bottom mounting hole 412. The diameter of the compression spring 45 fits the circular bottom mounting hole 412 of the heat insulative base 41. Because the sealing mechanism 40 is supported on the compression spring 45, it can be moved up and down in the casing 10 and is biased in the upward direction.

The press bar 20 comprises a heat insulative press block 21 at one end facing the protrusive middle portion 411 of the heat insulative base 41 of the sealing mechanism 40, a heat resisting cover sheet 22 covered on the heat insulative press block 21, and a pair of lugs 23 bilaterally disposed at an opposite end. The lugs 23 have a respective pivot pin 231 at an inner side respectively inserted into two transverse pivot holes 12 at one end of the casing 10. The heat resisting cover sheet 22 of the press bar 20 and the heat resisting cover sheet 44 of the sealing mechanism 40 are preferably made from same material, such as a Teflon mesh. Further, a spring plate 24 is provided between the press bar 20 and the casing 10 to impart an upward bias to the press bar 20. Because of the arrangement of the spring plate 24, the press bar 20 is normally maintained in an upward position to prevent direct contact between the heat resisting cover sheet 22 at the press bar 20 and the heat resisting cover sheet 44 at the sealing mechanism 40.

The safety device 70 is for open circuit protection. Safety device 70 preferably includes a safety switch 71 and a protective frame 73. In the particular embodiment illustrated in FIGS. 2 and 4, the safety switch 71 is mounted in the casing 10 at the rear thereof. Safety device 70 has two lead wires 72 respectively extending from two opposed terminals thereof and respectively connected to one front terminal plate 33 (which is not directly connected to the corresponding flat metal contact plate 331) and one flat metal contact plate 331 (which is not directly connected to the corresponding front terminal plate 33). See FIG. 8.

Figure 8:
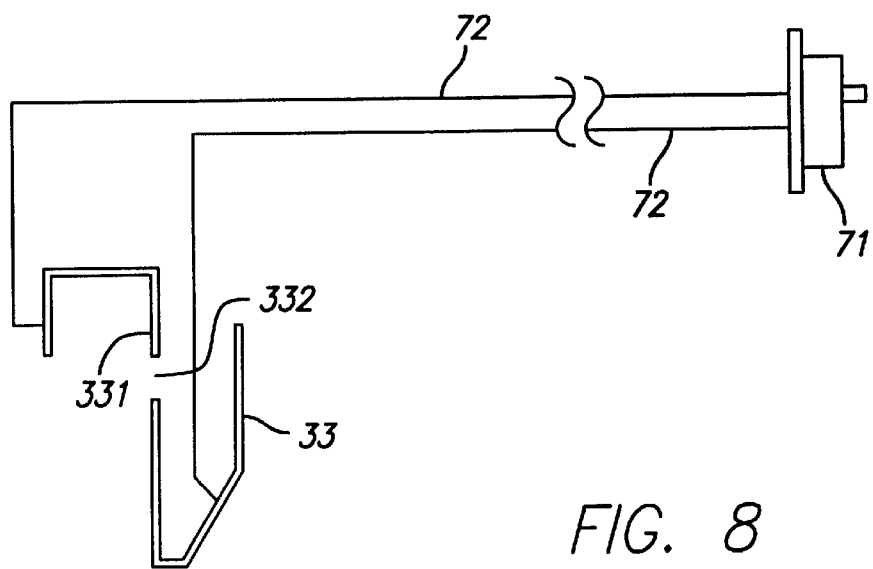
FIG. 8 is a circuit diagram showing the connection of an embodiment of a safety device of the invention (a safety switch) to the flat metal contact plate and front terminal plate of FIG. 7.

When the electric heat sealer is in use, the safety switch 71 is switched by a user to the "on" position. When the safety switch is in the "on" position, the gap 332 is bridged, enabling current to flow from terminal plate 33 to metal contact plate 331 as shown in FIG. 8. When the electric heat sealer is not in use, the safety switch 71 is switched by the user to the "off" position to keep the lead wires 72 in an open circuit state and prevent current from flowing from terminal plate 33 to contact plate 331 in FIG. 8. That is, the safety switch is a safety device that is adapted to selectively prevent electrical current from flowing through the electric heating wire. "Selectively" denotes that a user chooses a position which opens or closes the electric circuit and sets the device in the chosen position. The device remains in the selected state until the user changes the state of the device. Safety switch 71 can be a mechanical switch, an electrical device or any other device which permits selective prevention of electrical current flow.

Depressing the press bar 20 against the sealing mechanism 40 does not close the electric circuit when the safety switch 71 is set at the "off" position.

The protective frame 73 is pivotally connected to the casing 10 on the outside of the casing at the same end as the sealing mechanism 40. When the electric heat sealer is not in use, the protective frame 73 is pivoted upwards and retained between the heat insulative block 21 of the press bar 20 and the protrusive middle portion 411 of the heat insulative base 41 of the sealing mechanism 40 to stop the heat insulative block 21 from contacting the sealing mechanism 40. When in use, the protective frame 73 is pivoted outwardly and downwards to a position away from the heat insulative block 21 and the heat insulative base 41. Thus, the protective frame, by virtue of its pivotal motion between the foregoing two positions, is also adapted to selectively prevent electrical current from flowing through the electric heating wire.

Figure 5:
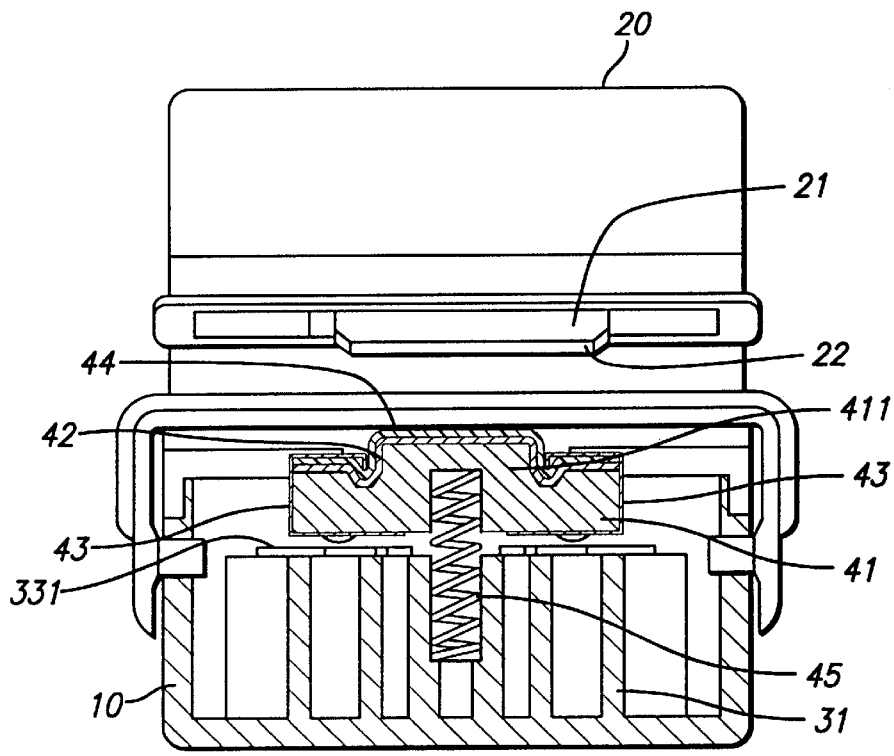
FIG. 5 is a sectional view of the present invention before operation.

Referring to FIG. 5, when the electric heat sealer is not in use, the heat insulative base 41 is biased upward by the compression spring 45 so that the locating plates 43 are spaced from the flat metal contact plates 331 to electrically disconnect the electric heating wire 42 from the battery cells. The safety switch 71 is switched 10 to the "off" position, and the protective frame 73 is pivoted upward to the top side of the casing 10 and retained between the heat insulative press block 21 and the protrusive middle portion 411 of the heat insulative base 41 of the sealing mechanism 40. Therefore the electric heat sealer is deactivated and performs no work.

Figure 6:
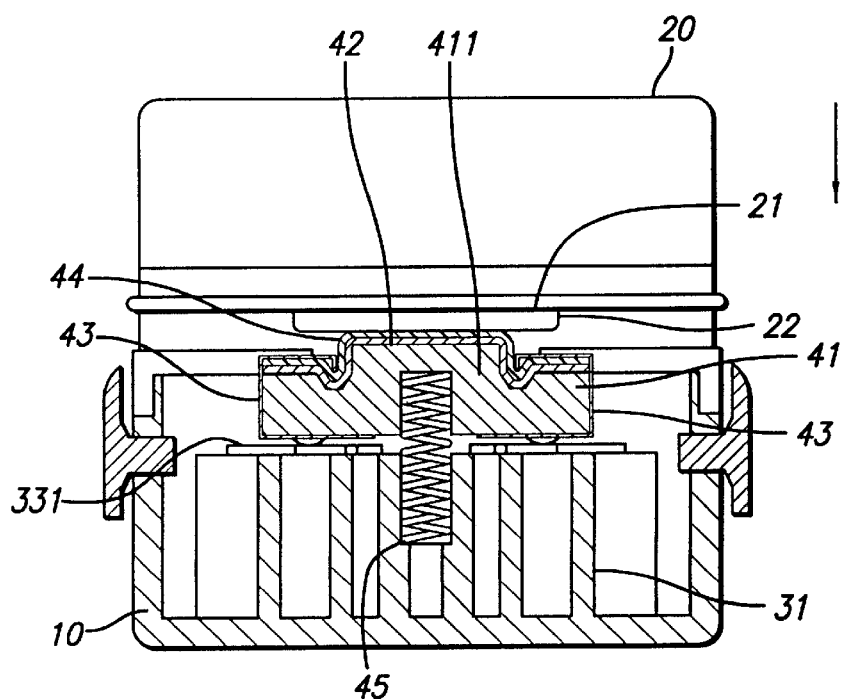
FIG. 6 is another sectional view of the present invention, showing the press bar pressed down.
Figure 7:
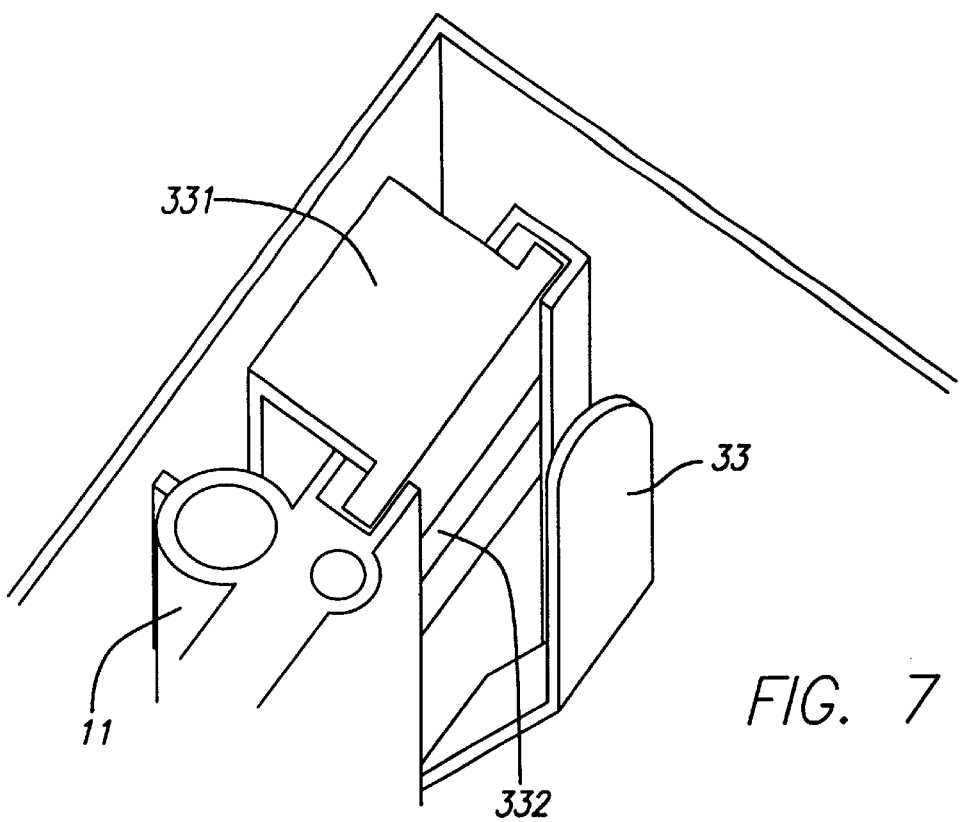
FIG. 7 is an enlarged view showing a flat metal contact plate and a front terminal plate separated by a gap.

Referring to FIG. 6, when in use, the protective frame 73 is pivoted outwardly and downwards from the position above the protrusive middle portion 411 of the heat insulative base 41 preferably to the front of the casing 10, and the safety switch 71 is switched to the "on" position to electrically connect the lead wires 72. When the press bar 20 is pressed down, the heat insulative press block 21 is forced against the heat insulative base 41. This causes the heat insulative base 41 to be lowered and forces the locating plates 43 into contact with the metal contact plates 331 to close the electrical circuit and heat the electric heating wire 42.

When sealing a workpiece, for example, a plastic bag, the open side of the plastic bag is placed between the protrusive middle portion 411 of the heat insulative base 41 and the heat insulative press block 21. Then the press bar 20 is pressed down to force the locating plates 43 into contact with the metal contact plates 331 respectively. This closes the electrical circuit, thereby causing the electric heating wire 42 to be heated. The open side of the plastic bag is thus melted and sealed by the heat produced by the electric heating wire 42. When the press bar 20 is released from the hand after use, the locating plates 43 are biased upward by the compression spring 45, along with the rest of the heat insulative base 41, from the metal contact plates 331 to open the electric circuit and prevent electrical current from the battery set from flowing through the electric heating wire 42.

In the foregoing embodiment, the inventive safety device includes both safety switch 71 and protective frame 73. If desired, either of these elements can be utilized separately.

Referring to FIG. 1 again, a cover device 50 is provided to cover the casing 10. The cover device 50 is comprised of a front cover plate 51, an intermediate cover plate 52, and a rear cover plate 53. The front cover plate 51 covers on the front portion of the casing 10 over the sealing mechanism 40. The intermediate cover plate 52 covers the middle portion of the casing 10 over the battery chamber 30. The rear cover plate 53 covers the rear portion of the casing 10. The front cover plate 51 has defined therethrough an opening 511 through which the protrusive middle portion 411 of the heat insulative base 41 extends.

Alternatively, cover device 50 can be comprised of two plates or can be formed from a single plate. That is, cover plates 51 and 52, 52 and 53, or 51–53 can be replaced with unitary structures.

Referring to FIG. 1 again, a magnetic bottom plate 80 is preferably fixedly mounted on the bottom of the casing 10. By means of the magnetic bottom plate 80, the electric heat sealer can be secured to a metal surface, for example a refrigerator door, by magnetic attraction.

Alternative embodiments of the foregoing heat sealer are also included within the scope of the present invention. In one alternative embodiment, the rear terminal unit can be replaced with two separate rear terminal plates 34 separated by a gap, and a safety switch can be connected between the plates 34 (rather than front plated 33 and 331 as described above) while the separated front plates 33 and 331 are placed in contact or form a single element.

In another alternative embodiment, electrical current can be supplied to electric heating wire 42 from an AC power source rather than a DC power source, or from both an AC power source and a DC power source. That is, the electric heat sealer can be adapted to be supplied with electrical current from at least one current source selected from an DC current source and an AC current source (including both DC and AC power sources). Exemplary alternative power sources for an electric heat sealer that can be adapted for use in the present invention are described, for example, in U.S. Pat. No. 5,142,123, which is incorporated herein in its entirety by reference. Safety switch 71 is disposed at an appropriate position in the electrical circuit between the electric heating wire and the DC and/or AC current source to selectively prevent current flow to the electric heating wire. Selection of the appropriate location for safety switch 71 in this embodiment is a matter of routine design choice for those skilled in the art.

In another alternative embodiment, the cover device 50 can be disposed on the bottom of the casing 10 rather than on the top of the casing, so that, for example, a battery set can be inserted from the bottom of the electric heat sealer. In this embodiment, if desired a magnetic bottom plate can be affixed to the cover device or a plate thereof if the cover device is comprised of multiple separate plates. In this embodiment an opening through which the protrusive middle portion 411 of the heat insulative base 41 extends is formed in an upper surface of the casing itself rather than in the cover device.

Figure 9:
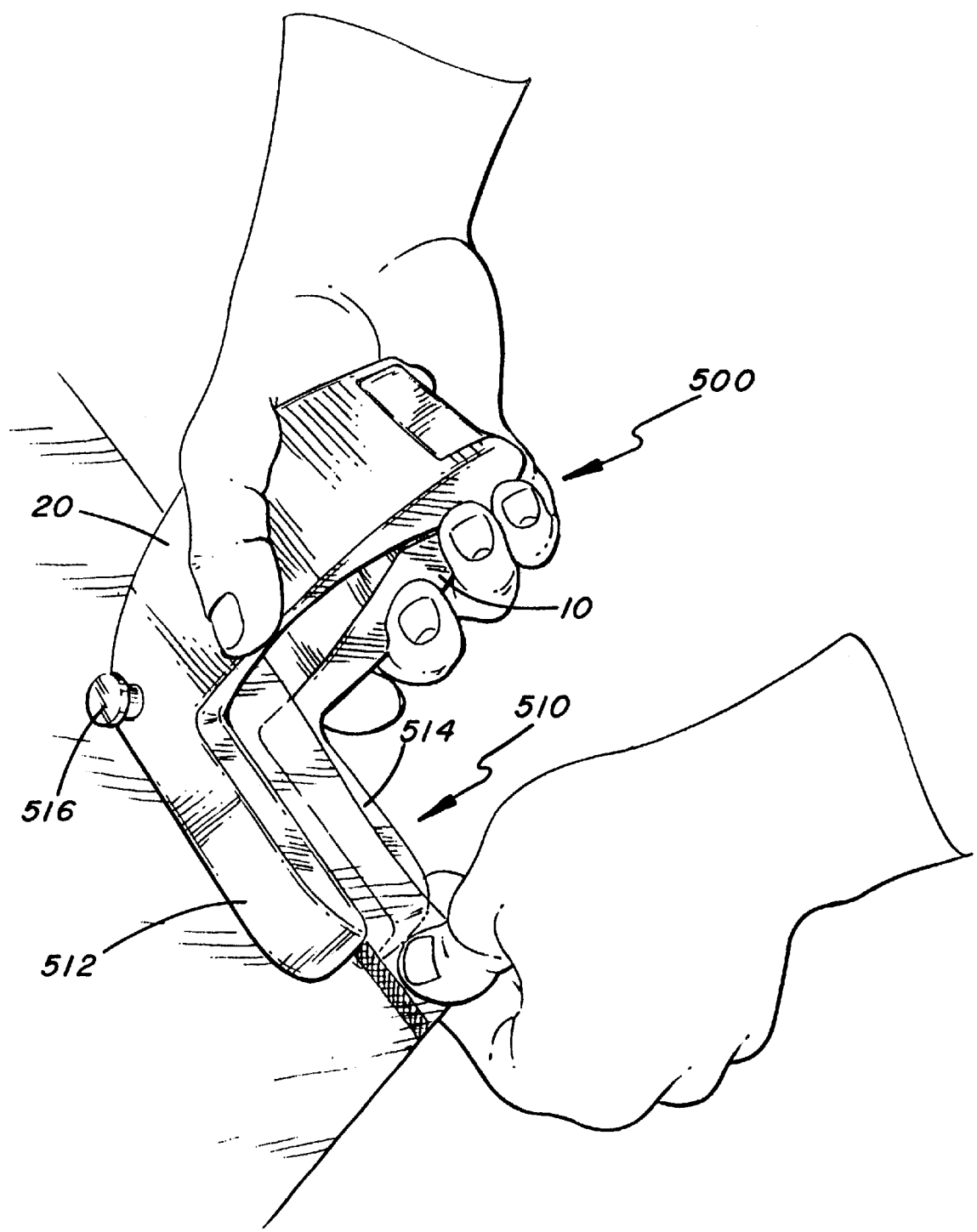
FIG. 9 is an environment view showing a heat sealer having an offset sealer portion sealing a plastic bag.
Figure 10:
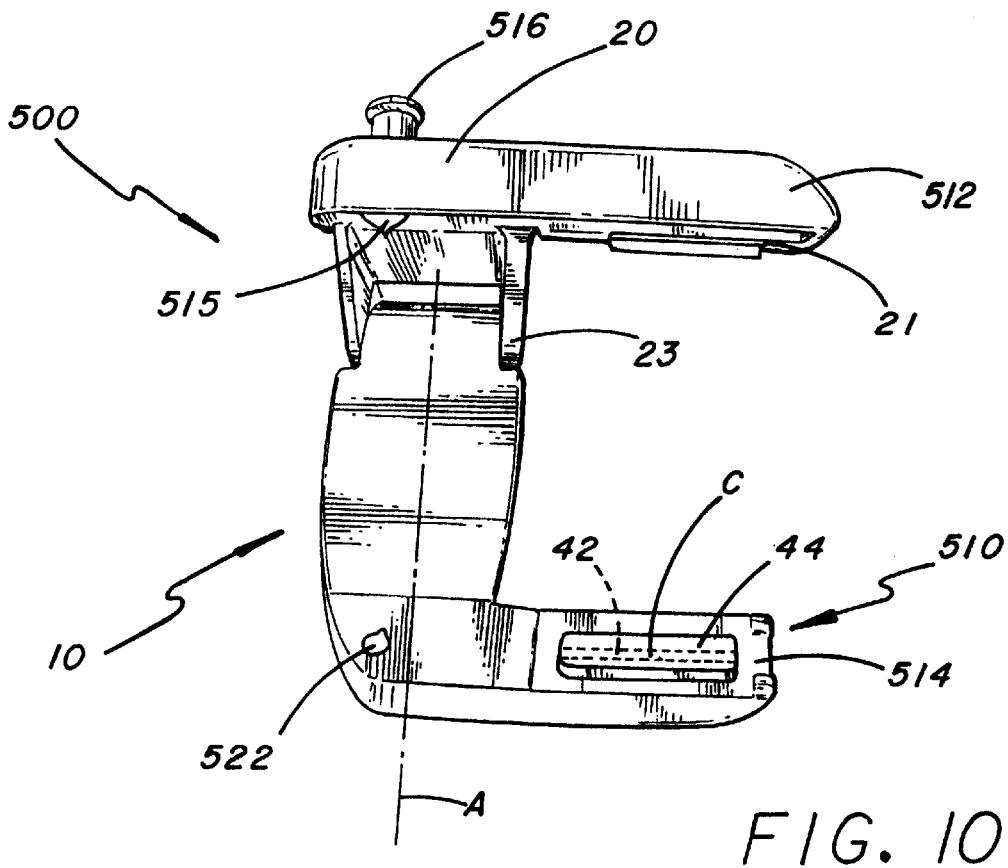
FIG. 10 is a front elevational view showing the heat sealer of FIG. 9 in an open position.
Figure 11:
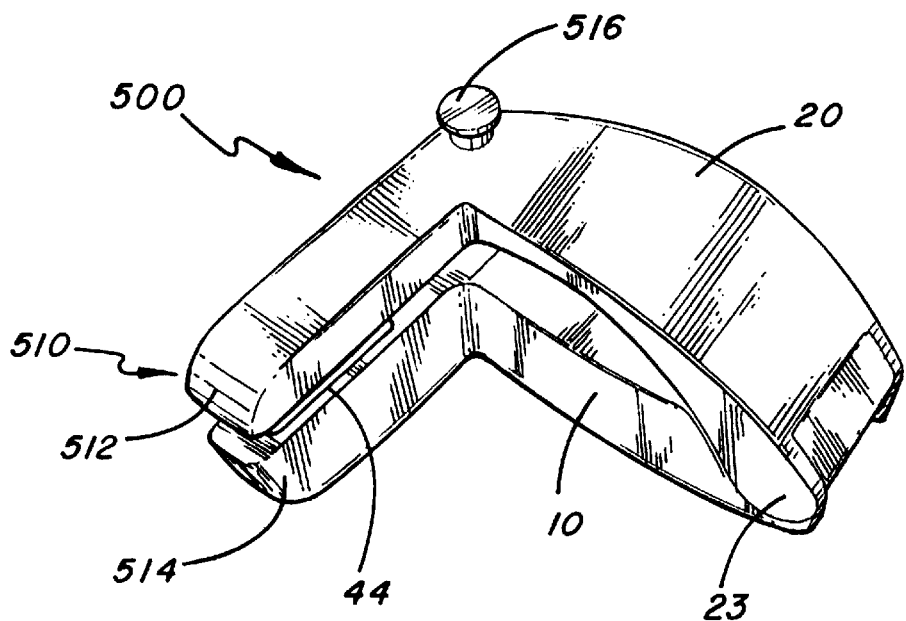
FIG. 11 is a perspective view of the heat sealer of FIG. 9.

Referring to FIGS. 9–11, an embodiment of an electric heat sealer 500 having an offset sealer portion 510 is shown. As best shown in FIGS. 10 and 11, sealer 500 is similar to those embodiments described above. However, where the above described embodiments included a sealing mechanism 40 and associated components that are aligned with a longitudinal axis defined by casing 10, the center point C of the sealing mechanism 40 (via the offset sealing portion 510) of sealer 500 is offset from the longitudinal axis A defined by casing 10.

An upper member 512 of the offset sealer portion 510 extends from the press bar 20, and a lower member 514 of the offset sealer portion 510 extends from the casing 10. Preferably, the offset sealer portion 510 extends in a direction substantially perpendicular to said longitudinal axis A, however, this is not a limitation on the present invention. The sealing mechanism 40 is disposed in the lower member 514 and preferably extends through an opening defined therein. It will be understood that the offset sealer portion 510 can be any desired length. Therefore, the components of the sealing mechanism 40, such as the heat insulative base 41 and the protrusive middle portion 411 thereof, electric heating wire 42 and the heat resisting cover sheet 44 can be longer than in the above described embodiments. This creates a longer sealing surface, and provides improved sealing capabilities. The heat insulative block 21 (and the heat insulative cover sheet 22) is located on the upper portion 512 and is preferably aligned with the heat insulative base 41 and the heat resisting cover sheet 44, such that when the press bar 20 is pressed, the heat insulative block 21 and the heat resisting cover sheet 44 sandwich the workpiece therebetween. The heat resisting cover sheet 44 can be removed so that the electric heating wire 42 can be replaced.

Preferably, the sealer 500 is activated automatically when the press bar 20 (and upper member 512) is pressed against the sealing mechanism 40, thereby urging the heat insulative base 41 downwardly and closing the circuit as described above. The sealer 500 can also include a safety switch 71 as described above. When the safety switch 71 is at an "off" position, the heating wire 42 cannot be activated even when the circuit is closed by urging the locating plates 43 into contact with the contact plates 331. When the safety switch 71 is in the "on" position, the heating wire 42 is energized when the circuit is closed by urging the locating plates 43 into contact with the contact plates 331. In an alternative embodiment, the electric heating wire 42 can be energized simply by switching safety switch 71 to the "on" position. In this embodiment, the heat insulative base 41 can be stationary, thereby eliminating the need for a spring, locating plates 43 or contact plates 331. Electric current can be supplied to the electric heating wire 42 of the sealer 500 by AC or DC power as described above.

As shown in FIG. 9, the offset portion 510 of the sealer 500 allows a bag to be sealed more easily with a single swipe. Thereby preventing the necessity of a second swipe as described above in the Background of the Invention.

In a preferred embodiment, the sealer 500 can also be used to open a sealed bag. Preferably the sealer 500 includes a slicer 515 that is actuated by a button 516. The button 516 extends through the upper portion 512 and is held in a first position by a spring. When the button 516 is pressed downwardly, the slicer 515, which is located on a bottom side of the upper portion 512, is urged downwardly. The sealer can include a stop plate 522 with which the slicer 515 comes in contact when the button 516 is depressed. To slice a bag or the like using the slicer 515, the user places a bag into position, as shown in FIG. 9, presses the press bar 20 downwardly, and simultaneously presses the button 516, thereby urging the slicer 515 downwardly and into contact with (and slicing through) the bag. The sealer 500 is then pulled across the bag in one motion, thereby slicing the bag open. In a preferred embodiment, the cutting portion of the slicer is made of a ceramic that easily cuts through a plastic bag, but that will not cut human skin. However, the slicer 515 can be made of metal or other cutting material.

It will be understood that other forms of slicers or cutters can be used with the present invention. For example, a safety cutting device such as that taught in copending U.S. application Ser. No. 09/141,167, filed Aug. 27, 1998, the entirety of which is incorporated herein by reference, can be used.

Figure 12:
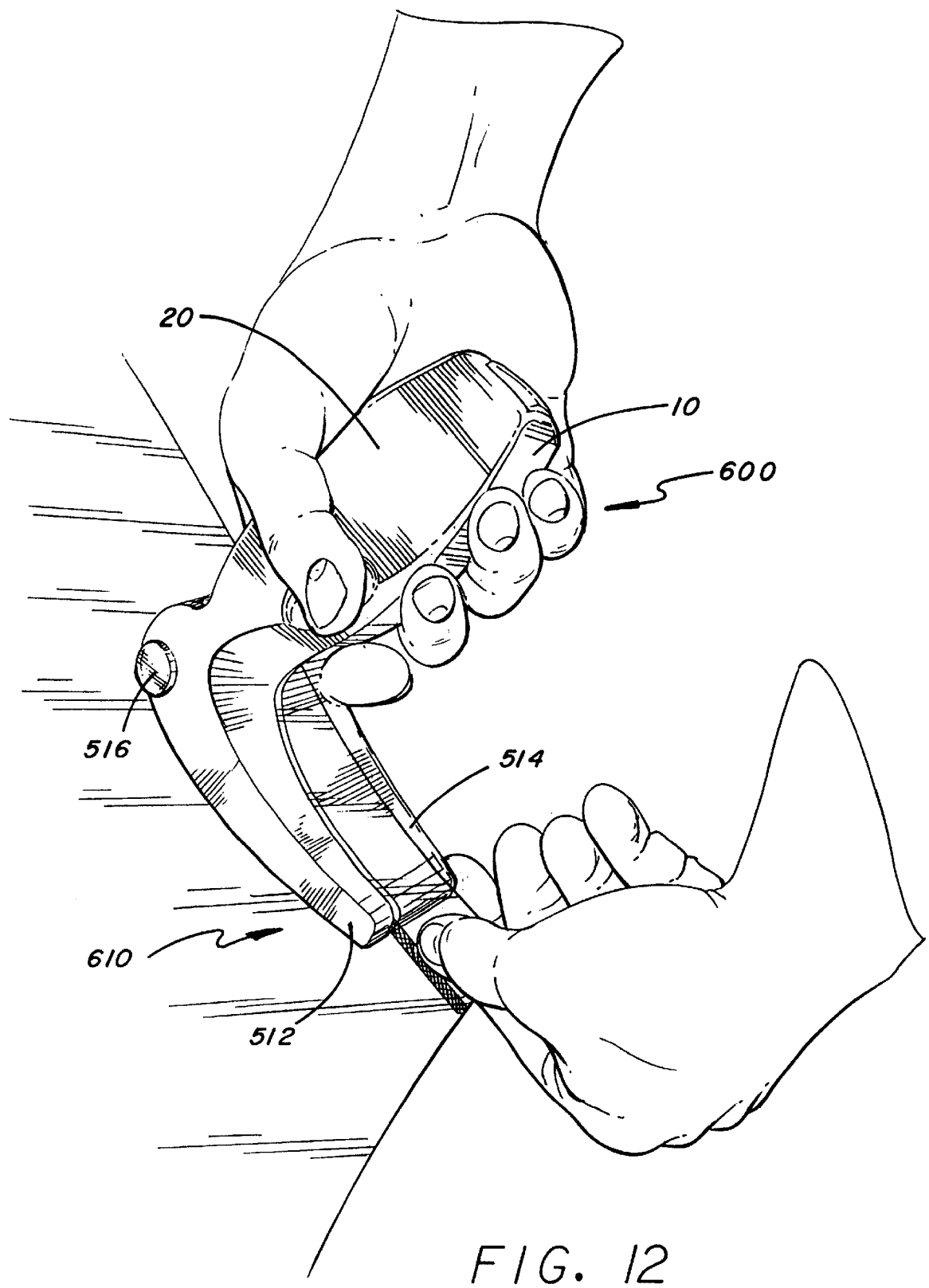
FIG. 12 is a is an environment view showing a heat sealer having an offset sealer portion similar to that of FIG. 9, but more ergonomically designed. The sealer is shown sealing a plastic bag.
Figure 13:
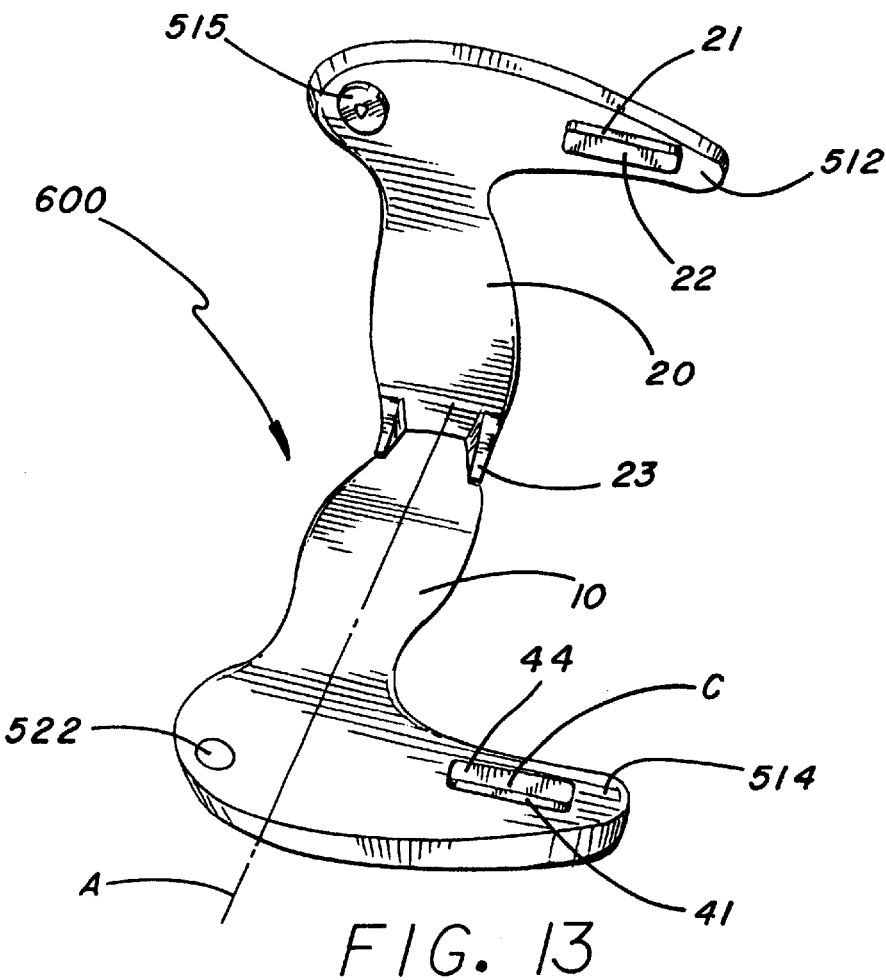
FIG. 13 is a front elevational view showing the heat sealer of FIG. 12 in an open position.
Figure 14:
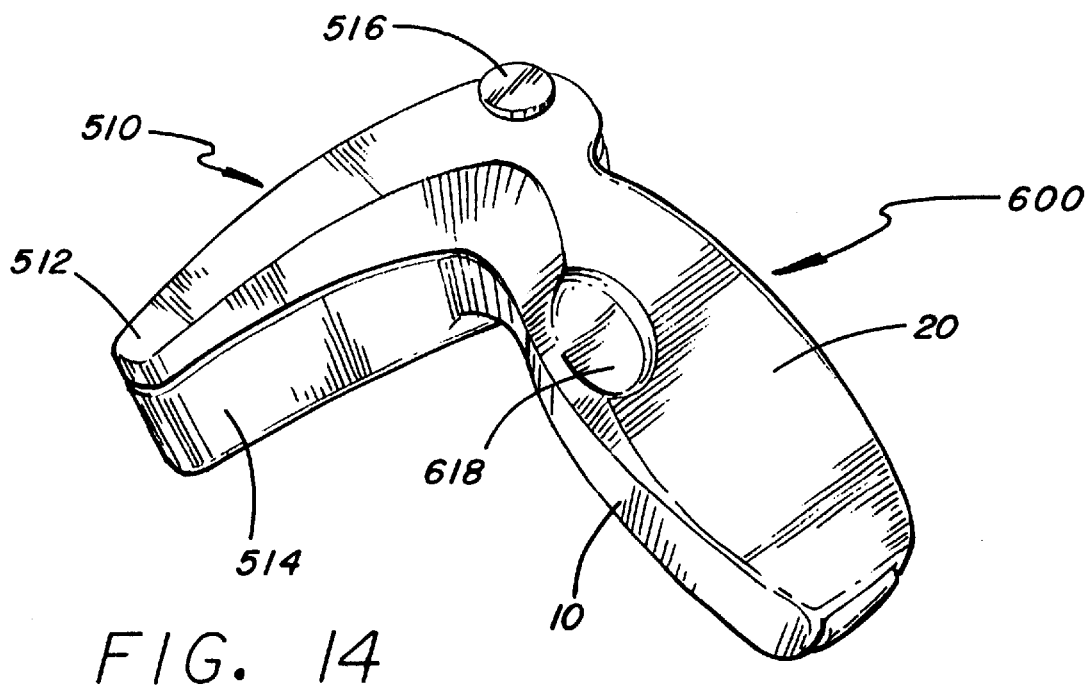
FIG. 14 is a perspective view of the heat sealer of FIG. 12.

FIGS. 12–17 show two more embodiments of electric heat sealers with an offset sealer portion 515. FIGS. 12–14 show a sealer 600 wherein the press bar 20, casing 10 and offset sealer portion 510 are designed for comfort in the hand of a user. The sealer 600 can be provided with a thumb depression 618 for ease of depressing the press bar 20. The working components of the sealer 600 are similar to those of the above described embodiments.

Figure 15:
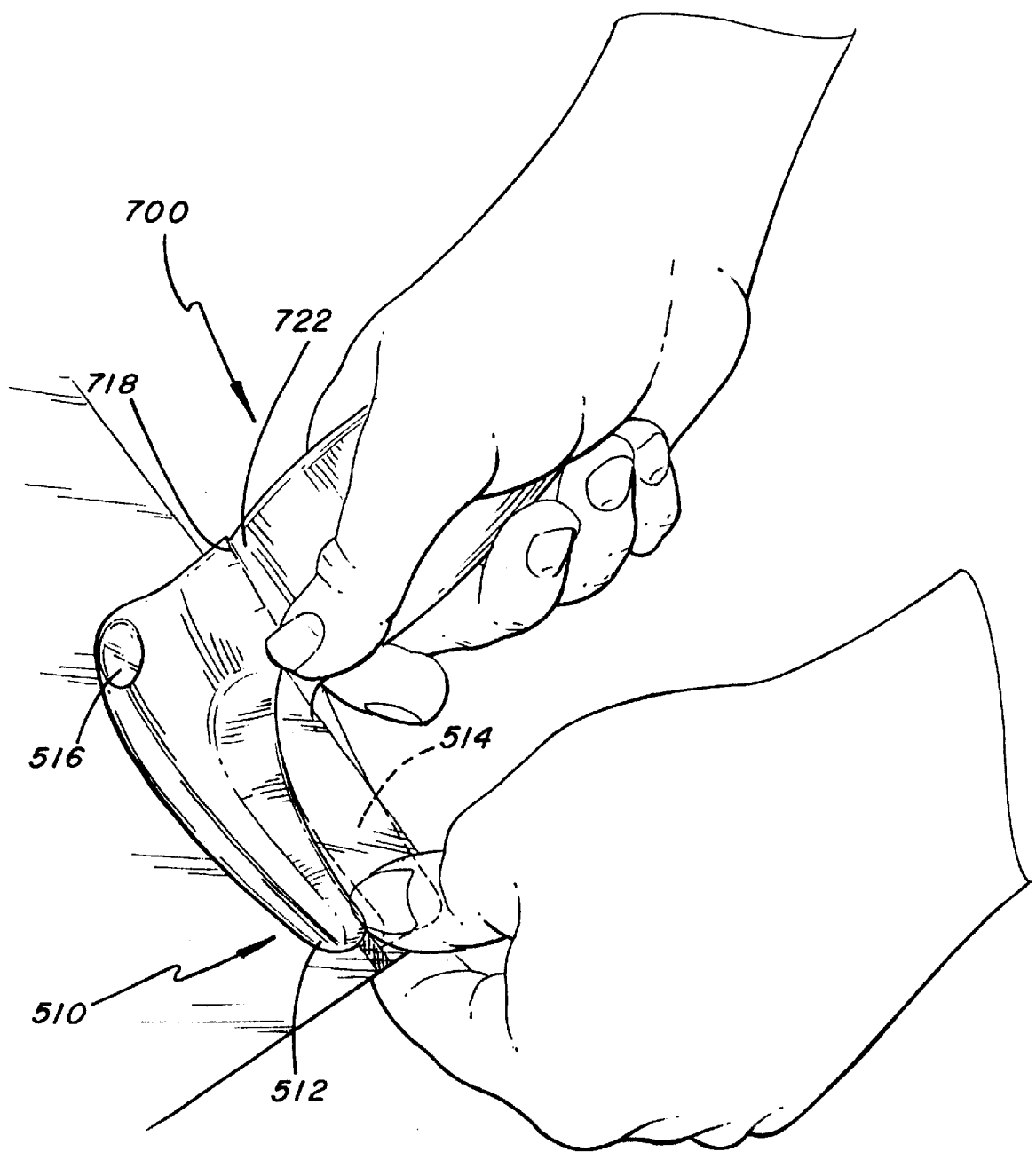
FIG. 15 is an environment view showing a heat sealer having an offset sealer portion similar to that of FIG. 12, but having the press bar pivotally connected to the casing at a neck portion. The sealer is shown sealing a plastic bag.
Figure 16:
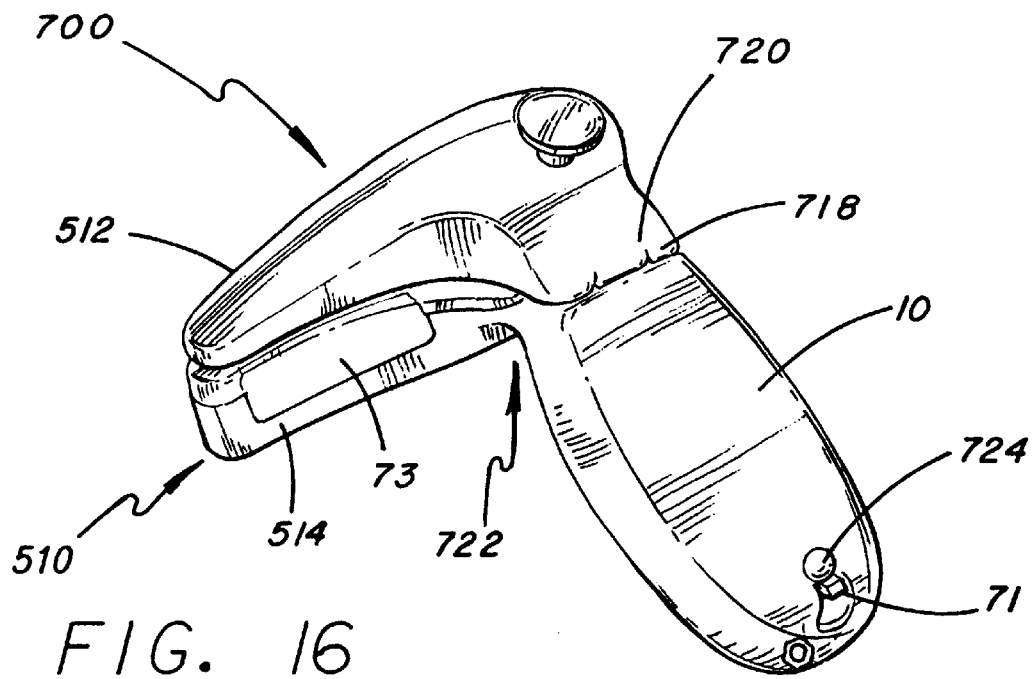
FIG. 16 is a front elevational view showing the heat sealer of FIG. 15 in an open position.
Figure 17:
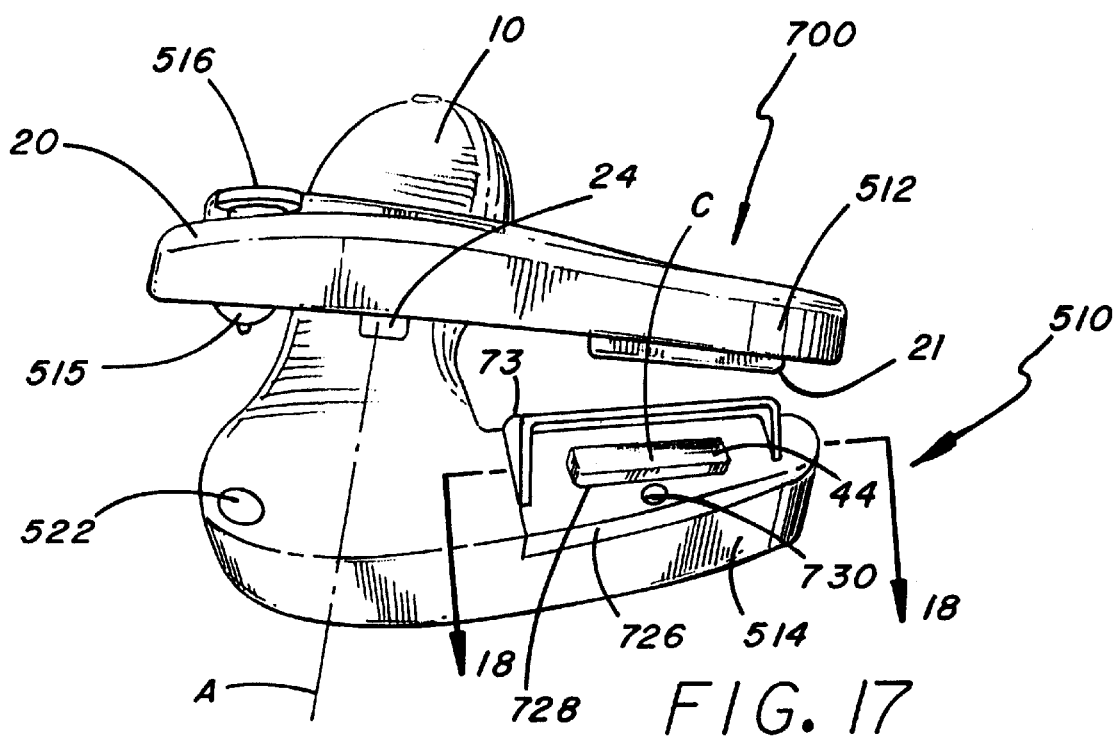
FIG. 17 is a perspective view of the heat sealer of FIG. 15.

FIGS. 15–17 show another sealer 700 having an offset sealer portion 510. Sealer 700 has a press bar 720 and upper member 512 of the offset sealer portion 510 that are pivotally connected via a hinge 718 to the casing 10 at a neck portion 722 of the casing 10. As can be seen in the figures, the casing 10 acts as a handle. The sealer 700 can also include an LED 724 that indicates when the circuit is opened and closed or that indicates if the battery has power or is "dead." As will be appreciated by those skilled in the art, the above described embodiments of electric heat sealers with offset sealer portions are constructed substantially the same as the sealers described above and shown in FIGS. 1–8, except that the sealing components are offset from the longitudinal axis defined by the main body portion.

As shown in FIGS. 16 and 17, the sealer 700 can also include a protective frame 73 as described above. The protective frame 73 is pivotally connected to the lower member 514, and is pivotable upwardly, as shown in FIG. 17. Preferably, the protective frame 73 is part of a removable frame 726 that is engaged with the lower member 514. Frame 726 has an opening 724 defined therein through which the protrusive portion 411 of the heat insulative base 41 extends when the frame 726 is secured on lower member 514. It will be understood that the frame 726 (and the opening 728 therein) is part of the offset sealer portion 510. The frame 726 can be secured on lower member 514 by any known method, for example, by a friction fit, by hooks, snaps, or a screw 730 as shown in FIG. 17. Such a frame for an electric heat sealer is taught in co-pending U.S. application Ser. No. 09/132,687, filed Aug. 12, 1998, now U.S. Pat. No. 6,064,038 to Chou, the entirety of which is incorporated herein by reference.

Figure 18:
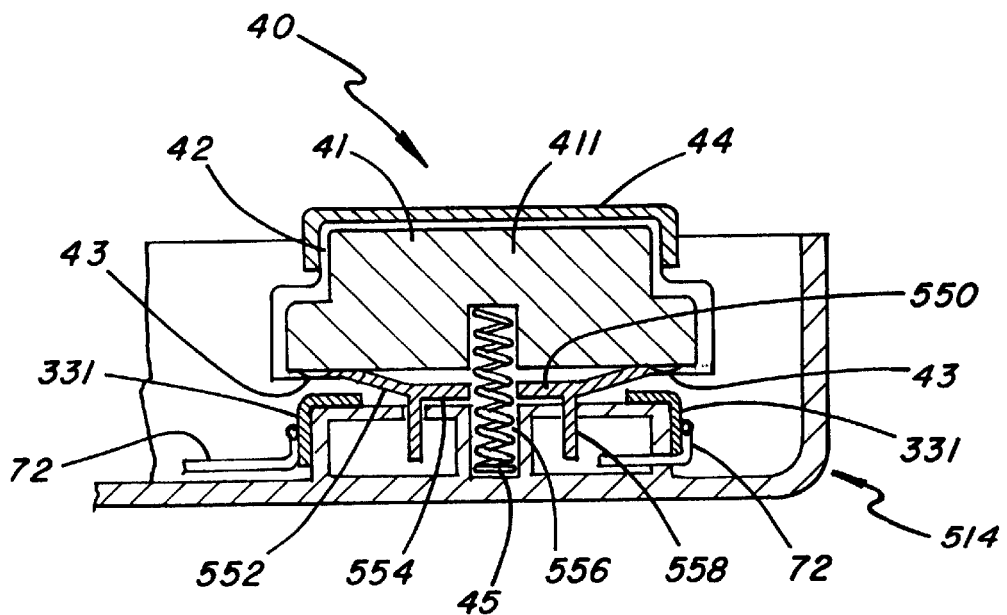
FIG. 18 is a cross-sectional elevational view taken along line 18--18 of FIG. 17, with the frame removed.
Figure 19:
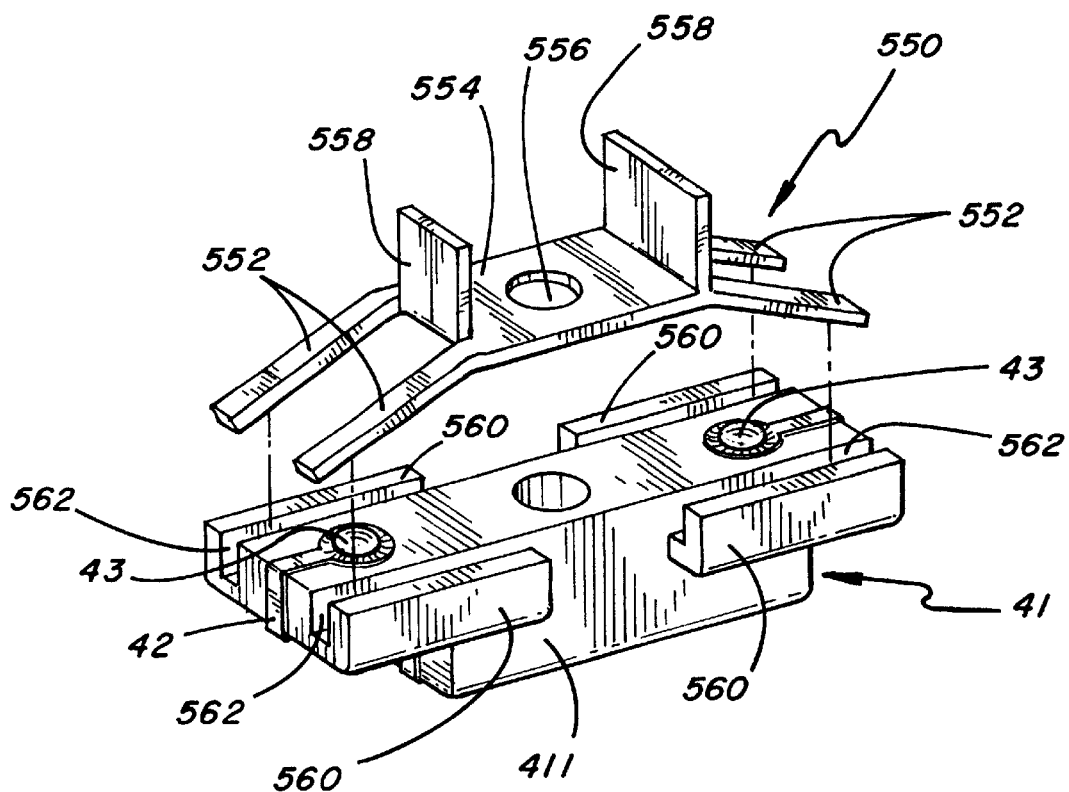
FIG. 19 is an exploded perspective view of the spring member and heat insulative base used in a preferred embodiment of the present invention.

FIG. 18 is a cross-sectional elevational view that shows a sealing mechanism 40 with a spring member 550 disposed in the lower member 514 of a sealer with an offset sealer portion. FIG. 19 shows a heat insulative base 41 and spring member 550 that can be used in a preferred embodiment of the present invention. In FIG. 19, the heat insulative base 41 and spring member 550 are shown upside down from their operative positions. The middle section 554 has an opening 556 defined therein through which a spring 45 can extend. The middle section 554 also has two support members 558 that extend downwardly therefrom, as shown in FIG. 18.

The heat insulative base 41 includes four extension portions 560 that extend from the sides thereof and define channels 562 between themselves and the main body portion 41a of the heat insulative base 41. The arms 552 of the spring member 550 are sized such that they can be received in the four channels 562 of the heat insulative base 41.

When assembled, the support members 558 of the spring member 550 are received in a pair of slots in the base of the lower member 514. The heat insulative base 41 rests on the spring member 550 such that the arms 552 are received in the channels 562, thereby supporting the heat insulative base 41 in a position wherein the locating plates 43 are spaced above the contact plates 331. In an alternative embodiment, the spring member 550 can be omitted and a spring 45 as described above can be used. In operation, the press bar 20 is pressed downwardly, thereby causing heat insulating cover sheet 22 to contact heat insulating cover sheet 44. The heat insulative base 41 is urged downardly (by spring member 550 flexing), thereby causing the locating plates 43 to contact the contact plates 331 and the circuit to close.

Figure 20:
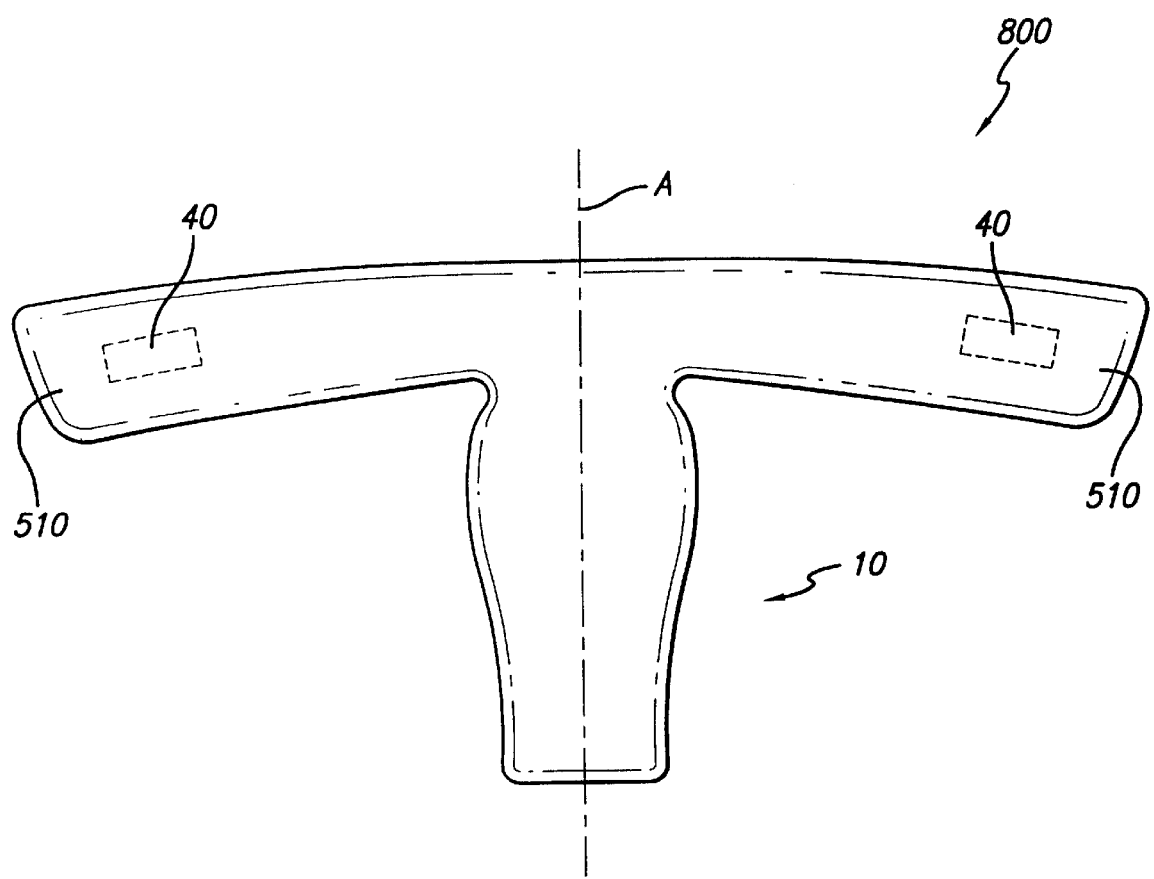
FIG. 20 is a plan view of a heat sealer having two offset sealer portions, in accordance with another embodiment of the present invention.

FIG. 20 shows another embodiment of the present invention, wherein an electric heat sealer 800, similar to those described above, includes two offset sealer portions 510, and two sealing mechanisms 40 and associated components. As shown in FIG. 18, both offset sealer portions 510 are offset from the axis A defined by the main body and casing 10 of the sealer 800.

The embodiments of the present invention recited herein are intended to be merely exemplary and those skilled in the art will be able to make numerous modifications to them without departing from the spirit of the present invention. For example, the sealing mechanism, and in particular, the electric heating wire can be shortened to provide a longer battery life. In this alternative embodiment, the electric heating wire can be less than 1.0" in length. Preferably, the electric heating wire is less than 0.75" in length, and more preferably the electric heating wire is less than 0.50" in length. The shorter the electric heating wire is, the longer the batteries will last. The electric heating wire can be made of a non-ferrous material, such as copper or any other type of material to improve battery life. All such modifications are intended to be within the scope of the present invention as defined by the claims appended hereto.

What is claimed is:

1. An electric heat sealer comprising a main body having a longitudinal axis, and a sealing mechanism having a center point, wherein said center point is offset from said longitudinal axis, wherein said main body includes a first offset sealer portion extending therefrom, wherein said sealing mechanism is at least partially mounted in said first offset sealer portion, and wherein a portion of said sealing mechanism extends through an opening in said offset sealer portion.

2. The electric heat sealer of claim 1 wherein said main body comprises a casing.

3. The electric heat sealer of claim 2 which is adapted to be supplied with electrical current from a DC current source which is a battery set, and wherein said casing defines a battery chamber adapted to receive a battery set.

4. The electric heat sealer of claim 1 further comprising an offset sealer portion extending from said body, wherein said sealing mechanism is disposed in said offset sealer portion.

5. The electric heat sealer of claim 4 wherein said offset sealer portion extends from said casing in a direction substantially perpendicular to said longitudinal axis.

6. The electric heat sealer of claim 1 wherein said sealing mechanism includes an electric heating wire through which electric current flows.

7. The electric heat sealer of claim 6 further comprising a safety device which selectively prevents electrical current from flowing through said electric heating wire.

8. The electric heat sealer of claim 7 wherein said safety device comprises a safety switch arranged in series with said electric heating wire.

9. The electric heat sealer of claim 6 wherein said sealing mechanism further comprises a heat insulative sheet covered on said electric heating wire.

10. The electric heat sealer of claim 1 further comprising a press bar and an offset sealer portion having an upper member and a lower member, wherein said main body includes a casing, wherein said upper member extends from said press bar and said lower member extends from said casing.

11. The electric heat sealer of claim 10 wherein said press bar has a fixed end pivotally connected to said casing and a free end on which is mounted a heat insulative press block, said heat insulative press block being forced against said heat insulative base when said press bar is depressed.

12. The electric heat sealer of claim 11 further comprising a device attached to said casing for preventing contact between said press bar and said sealing mechanism.

13. The electric heat sealer of claim 1 wherein said sealing mechanism is movable up and down.

14. The electric heat sealer of claim 1 wherein said sealing mechanism comprises:
    (a) a heat insulative base,
    (b) an electric heating wire, and
    (c) two metal locating plates,
    said heat insulative base comprising a protrusive middle portion, said electric heating wire being mounted on said protrusive middle portion of said heat insulative base, said metal locating plates being fastened to said heat insulative base at two opposite sides thereof and respectively connected to two opposite ends of said electric heating wire.

15. The electric heat sealer of claim 1 which is adapted to be supplied with electrical current from at least one current source selected from the group consisting of a DC current source and an AC current source.

16. The electric heat sealer of claim 15 further comprising a safety switch arranged in series with said electric heating wire, and which selectively prevents electrical current from flowing through said electric heating wire.

17. An electric heat sealer comprising a main body having a longitudinal axis, and a sealing mechanism having a center point, wherein said center point is offset from said longitudinal axis, wherein said sealer further comprises an offset sealer portion and a safety device that comprises a protective frame pivotally connected to said offset sealer portion on the outside thereof and pivotable between a first position in which said protective frame is disposed above said sealing mechanism, and a second position in which said protective frame is not disposed above said sealing mechanism.

18. An electric heat sealer comprising
    (a) a casing defining a longitudinal axis and having a first offset sealer portion extending therefrom, and
    (b) a sealing mechanism mounted in said first offset sealer portion, said sealing mechanism having a center point, said center point being spaced from said longitudinal axis,
    wherein said first offset sealer portion includes an opening defined therein through which a portion of said sealing mechanism extends.

19. The electric heat sealer of claim 18 wherein said first offset sealer portion includes an opening defined therein through which a portion of said sealing mechanism extends.

20. The electric heat sealer of claim 18 further comprising a second offset sealer portion extending from said casing in a direction substantially opposite of said first offset sealer portion.

21. An electric heat sealer comprising a main body having a longitudinal axis, and a sealing mechanism having a center point, wherein said center point is offset from said longitudinal axis, said sealer further comprising a device for cutting a workpiece.

22. The sealer of claim 21 further comprising a press bar, wherein said device for cutting said workpiece is located on said press bar.

23. The sealer of claim 22 wherein said device for cutting said workpiece comprises a button in cooperation with a slicer.

24. The sealer of claim 23 wherein said slicer is comprised of ceramic.

25. A method of sealing comprising the steps of:
    (a) providing an object to be sealed, and
    (b) sealing said object to be sealed using a sealer wherein an offset sealer portion follows a main body portion,
    wherein said offset sealer portion includes an opening defined therein through which a sealing mechanism extends.

26. A method of sealing comprising the steps of:
(a) providing an electric heat sealer having an offset sealer portion with a heating wire, wherein said offset sealer portion includes an opening defined therein through which a sealing mechanism extends,
(b) providing an object to be sealed
(c) positioning said sealer such that said heating wire extends over an edge of said object to be sealed, and
(d) sealing said object to be sealed with a single swipe.

27. The method of claim 26 comprising the further step of causing said sealer to apply an offset force to said object to be sealed between steps (c) and (d).

28. A sealing mechanism for use with an electric heat sealer, said sealing mechanism comprising:
a heat insulative base, said heat insulative base having at least one extension member extending from a side thereof, wherein a channel is defined between said side and said extension member.

29. The sealing mechanism of claim 28 further comprising a pair of locating plates secured to a bottom of said heat insulative base.

30. The sealing mechanism of claim 28 wherein said heat insulative base includes a protrusive middle portion having an electric heating wire secured thereto.

31. An electric heat sealer comprising:
(a) a casing,
(b) a sealing mechanism mounted within said casing, said sealing mechanism including an electric heating wire through which electrical current flows, wherein said sealing mechanism extends through an opening in said casing,
(c) and further comprising at least two of the following elements:
(i) a main body having a longitudinal axis, wherein said sealing mechanism has a center point that is offset from said longitudinal axis,
(ii) a safety switch arranged in series with said electric heating
(iii) a protective frame pivotally connected to said casing on the outside thereof and pivotable between a first position in which said protective frame is disposed above said sealing mechanism, and a second position in which said protective frame is not disposed above said sealing mechanism,
(iv) a device for cutting a workpiece,
(v) wherein said electric heating wire is less than 0.75" in length,
(vi) wherein said electric heating wire is made of a non-ferrous material.

* * * * *